May 31, 1966   H. L. WILLIAMS   3,253,571
APPLIANCE FOR LINEAR BODIES
Filed April 22, 1965   2 Sheets-Sheet 1
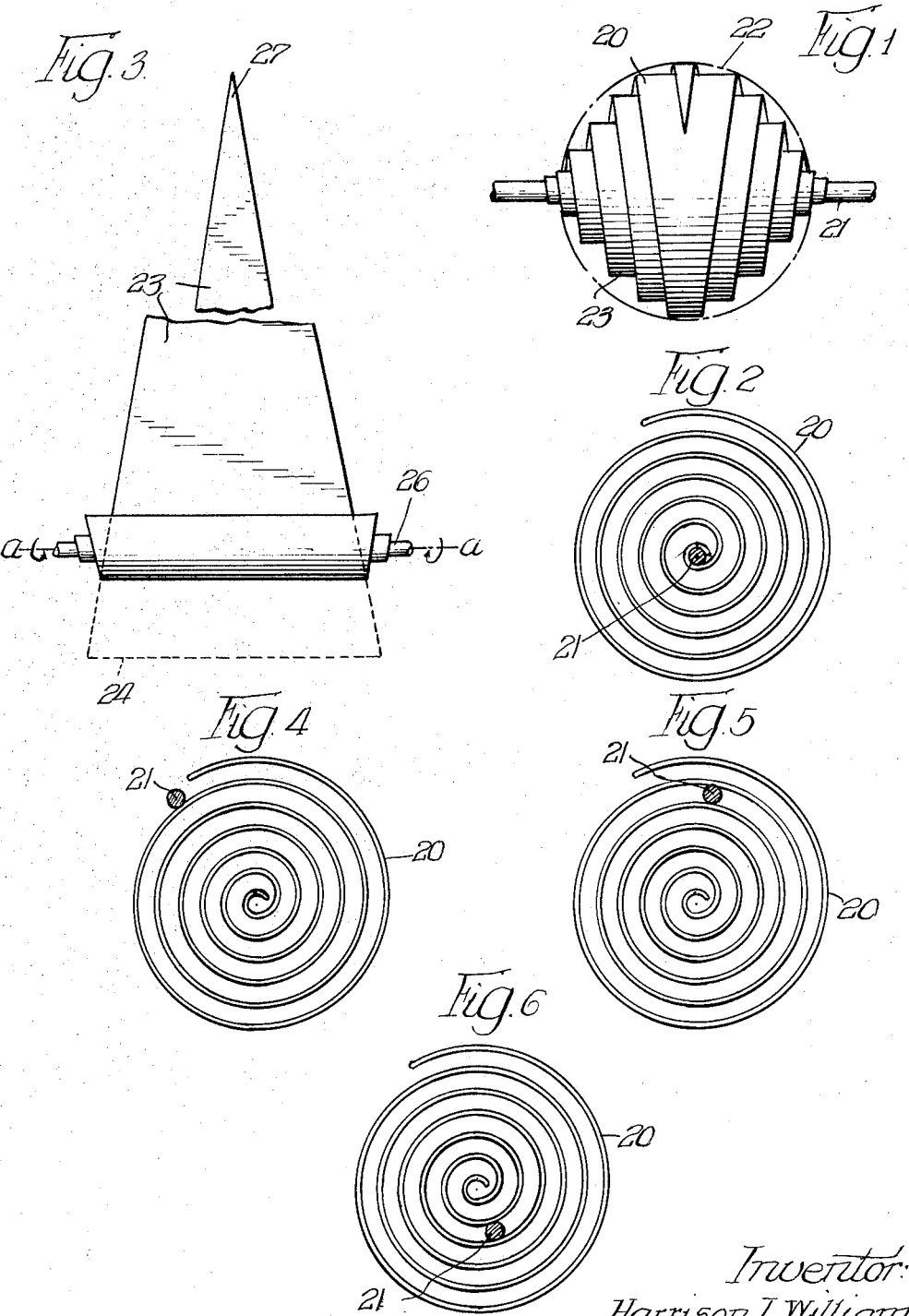

May 31, 1966  H. L. WILLIAMS  3,253,571
APPLIANCE FOR LINEAR BODIES
Filed April 22, 1965  2 Sheets-Sheet 2
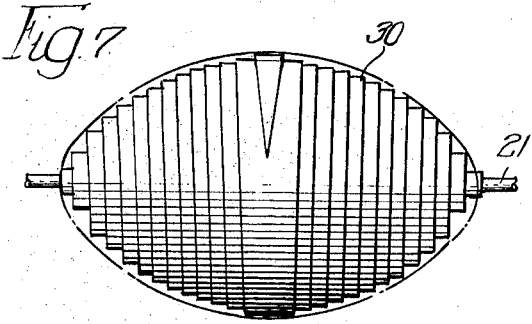
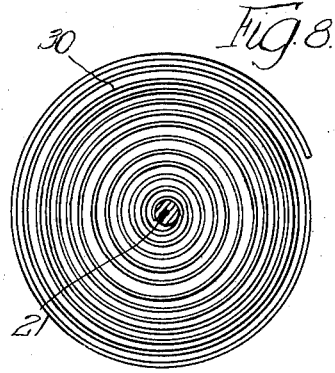
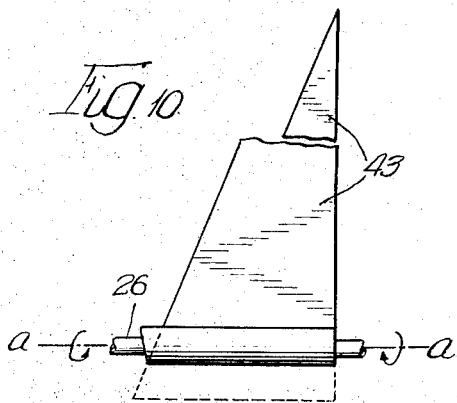
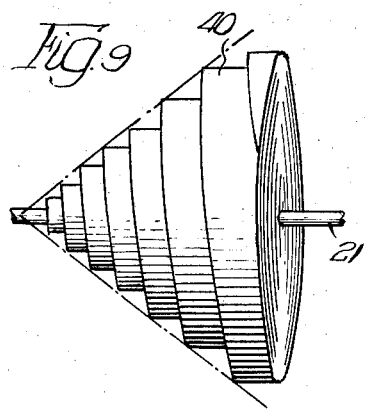
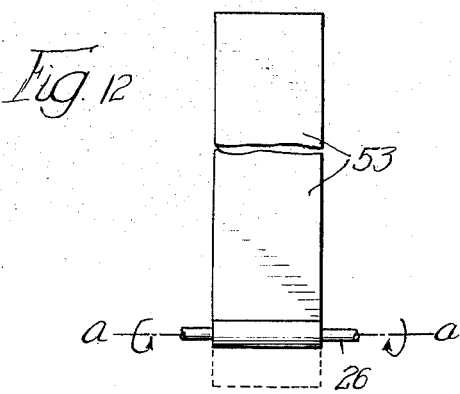
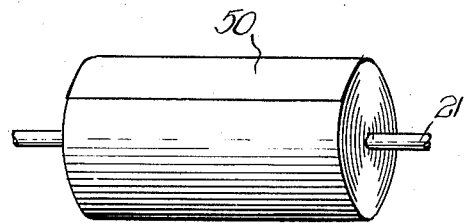
Inventor:
Harrison L. Williams

United States Patent Office 3,253,571
Patented May 31, 1966

3,253,571
APPLIANCE FOR LINEAR BODIES
Harrison L. Williams, Euclid, Ohio, assignor to Preformed Line Products Company, Cleveland, Ohio, a corporation of Ohio
Filed Apr. 22, 1965, Ser. No. 450,041
7 Claims. (Cl. 116—114)

This invention relates to appliances for linear bodies, such as suspended electrical cables, and in particular, to appliances especially suited for visually indicating the presence of such linear bodies.

Suspended electrical cables, particularly those for carrying very high voltages and commonly designated as "high tension lines" pose a constant safety problem for aircraft, especially in the vicinity of airports where a considerable amount of air traffic is found at a relatively low altitude. The suspended cables are not easily seen from moving aircraft.

Numerous devices have been devised as means for visually indicating the pressence of such a line to the pilot of the aircraft. One of the earliest of indicating devices comprised a brightly colored flag or pennant which was attached to and suspended from the line. However, a characteristic drawback of the flag-type indicating device arises from the fact that it is not readily visible from a number of angles. The wind may move the flag or pennant into a position with respect to the pilot's line of vision such that the pilot fails completely to see the signaling device. For this reason, the flag-type device is not considered acceptable as a visual indicator of the presence of electrical lines or other such linear bodies.

Another type of prior art visual indicating device is the spherical-type indicating device which comprises two hemispherical members which are clamped on the line or cable so as to form a sphere with a polar axis coincident with the line or cable. The clamps prevent the sphere from being moved axially along the line. While this type of indicating device overcomes the disadvantage of limited angular visibility found in the flag-type indicating device, it has other attendant disadvantages. Unless the hemispherical members are adequately provided with drain apertures, there is a tendency to internally collect moisture as a result of precipitation and condensation, thereby imparting an undesired weight load on the suspended line, a matter of considerable concern to power companies. In addition, the clamps which affix the hemispherical members to the line normally have rather rigid jaws and extend for only a very short length along the linear body, thereby tending to produce a fatigue-inducing stress concentration by producing short lengths of line which are non-vibratory relative to the remainder of the line and which are separated by sharp lines of demarcation from the remainder of the line which is normally in a state of climatically-induced vibration. Moreover, it is generally necessary that tools be carried aloft and used in securing the clamps to the line.

It is an object of the present invention to provide an appliance for visually indicating the presence of a linear body which is readily visible from various angles and which may be easily applied to a suspended linear body at any point along the length of such linear body without the use of tools.

It is an additional object of the present invention to provide an appliance for signaling the presence of a linear body which is particularly characterized by its light weight and its avoidance of fatigue-inducing stress concentration at the points at which it is applied to the linear body while securely gripping the linear body so that there is little axial movement of the appliance on the linear body.

It is another object of the present invention to provide an appliance for attachment to a linear body for visually indicating the presence of the linear body in which the tendency to internally accumulate moisture as the result of condensation or precipitation is minimized.

It is a further object of the present invention to provide an appliance for visually indicating the presence of a linear body which may be inexpensively fabricated as a single integral structure.

It is a specific object of the present invention to provide an appliance adapted to be mounted on a linear body such as a suspended electrical cable comprising a relatively thin, elongate member preshaped in a coiled configuration in which said elongate member is wound from one end about a predetermined axis with the result that the coiled configuration presents substantially the profile of a geometric solid such as a spheroid, ellipsoid, cone, or cylinder.

These and other features and objects of the invention will be made apparent by reference to the specification taken together with the drawings.

In the drawings:
FIGURE 1 is a side view in elevation of a preferred form of the appliance.
FIGURE 2 is an end view in elevation of the form of the appliance shown in FIGURE 1.
FIGURE 3 illustrates the manner in which the appliance shown in FIGURE 1 may be preshaped.
FIGURES 4, 5 and 6 illustrate a method for applying the appliance to a linear body.
FIGURE 7 is a side view in elevation of another preferred form of the appliance.
FIGURE 8 is an end view in elevation of the form of the appliance shown in FIGURE 7.
FIGURE 9 is a perspective view of still another preferred form of the appliance.
FIGURE 10 illustrates the manner in which the form of the appliance shown in FIGURE 9 may be preshaped.
FIGURE 11 is a perspective view of one more preferred form of the appliance.
FIGURE 12 illustrates the manner in which the form of the appliance shown in FIGURE 11 may be preshaped.

Referring now to FIGURES 1 and 2 there is shown a preferred embodiment of the invention generally designated by the reference numeral 20 mounted on an electrical cable or other linear body 21. As indicated by the phantom envelope 22, the appliance 20 presents substantially the profile of a spheroid, particularly when viewed from a distance.

Referring additionally to FIGURE 3, it is seen that the appliance 20 comprises a triangular member 23 which has been preshaped in a coiled configuration. The triangular member 23 is depicted in FIGURE 3 in a broken view. The triangular member 23 is preferably cut or stamped from a relatively thin sheet of plastic, sheet metal, or the like. In this form of the appliance, the initial planar configuration of the triangular configuration of the triangular member 23 is substantially that of an isosceles-triangular member 23. The isosceles-triangular member 23 is preshaped into the coiled configuration by winding it from its base edge 24 about an axis a—a.

This may be accomplished in practice by winding the member 23 about a mandrel 26, as illustrated in FIGURE 3.

The length or height of the isosceles-triangular member 23 from its base edge 24 to the opposing apex 27, the number of convolutions or turns in the coiled configuration, and the thickness of the material from which the member 23 is cut or stamped are matters of design which will vary in practice. As best illustrated in FIGURE 2, the appliance 20 may be preshaped with a predetermined spacing between adjacent convolutions so as to reduce the amount of material required to effect the desired spheroid profile. This spacing may be accomplished by winding or rolling up the member 23 together with a sheet of spacing material such as batting, rubber matting, or the like. When the member 23 has been preshaped to the desired configuration, the spacing material is easily removed.

The first or innermost turn or convolution in the coiled configuration of the member 23 should preferably have an internal diameter which is slightly less than the diameter of the electrical cable so that the electrical cable 21 will be gripped by the innermost turns as shown in FIGURE 2, thereby securely holding the appliance 20 on the cable 21 and preventing axial movement of the appliance 20 relative to the cable 21.

Referring now to FIGURES 4, 5, and 6, there is illustrated a method of applying the appliance 20 to the electrical cable 21. As depicted in FIGURE 4, the cable 21 is inserted under the triangular tip or apex 27 of the appliance at the end of the outermost turn of the coiled configuration. The appliance 20 is then rotated relative to the linear body 21 so that the linear body follows each turn in the coil configuration, as illustrated in FIGURES 5 and 6, until it reaches the innermost turn at which point it is snapped into place in the innermost turn. In order that the appliance 20 will properly engage the cable 21 when the cable 21 is snapped into place as described, it is preferable that the appliance 20 be fabricated of material of sufficient resilience. A resilience characteristic will also permit the appliance 20 to accommodate large transient forces, such as produced by gusts of wind, without fatigue or fracture. It should be noted that since the length of the gripping area of the appliance 20 is equal to the length of the base edge 24, a fairly large gripping area is presented, approaching the magnitude of the product of the base edge 24 and the circumference of the innermost convolution of the coiled configuration. This relatively large gripping area together with the use of resilient material to comprise the appliance 20 will substantially avoid the problem of stress concentration inherent in the clamps required to affix many other forms of indicating devices found in the prior art.

With the appliance 20 affixed to the electrical cable 21, the spheroid shape adds visual mass to the cable 21 which is readily visible from a considerable distance and from various angles while its coiled structure minimizes any tendency to internally collect moisture or condensation. In order to enhance the visual distinctiveness of the appliance, it is preferably very brightly colored. It may be found to be a further advantage for coded signaling purposes, for example, to utilize additional forms of the appliance which present shapes or profiles of geometric solids other than that of ellipsoid illustrated in FIGURES 1 and 2. The FIGURES 7 through 12 illustrate such other forms of the appliance. Except for their differing shapes or profiles, the other forms of the appliance shown in FIGURES 7 through 12 are characterized by the same features and manner of construction as described in reference to appliance 20.

In FIGURES 7 and 8 a form of the appliance designated by the reference numeral 30 is shown mounted on the cable 21. The appliance 30 is very similar to the appliance 20 but is adapted to present substantially the profile of an ellipsoid. As shown in FIGURE 8, the appliance 30 is more closely wound than appliance 20 although this is not a necessary difference between the two forms of the appliance and is primarily intended to illustrate the improvement of axial visibility which can be obtained when advantageous by closer winding of the coiled configuration.

In FIGURE 9 another form of the appliance designated by the reference numeral 40 is shown mounted on the cable 21 and presenting substantially the profile of a cone. The appliance 40 is preshaped on the mandrel 26 from a member 43 having the shape of right triangle, which may be conveniently termed a right-triangular member, as illustrated in FIGURE 10. The member 43 is depicted in FIGURE 10 in a broken view. The direction indicating characteristic of appliance 43 may in some circumstances be found to be a salient advantage of this form of the appliance.

Finally, in FIGURE 11 one more form of the appliance designated by the reference numeral 50 is shown mounted on the cable 21 and presenting substantially the profile of a cylinder. The appliance 50 is preshaped on the mandrel 26, from a rectangular member 53 as illustrated in FIGURE 12. The member 53 is depicted in FIGURE 12 in a broken view.

Although certain specific embodiments of the invention have been shown and described hereinbefore, it is to be understood that this is merely by way of example and in no manner to be considered a limitation. It will be apparent that certain modifications may be made within the scope of the claims without departing from the spirit of the invention.

What is claimed is:

1. An appliance adapted to be self-secured to a linear body such as a suspended electrical cable comprising a relatively thin elongate sheet member preshaped in a coiled configuration in which said elongate member is multiply overlyingly convoluted from one end about a predetermined axis with substantial spacing between adjacent overlying convolutions and has an inner convolution with at least a portion having an internal diameter less than the diameter of the linear body and adapted to resiliently grip the linear body, said coiled configuration having sufficient resilience and convolution spacing to allow the rotation of said coiled configuration onto the linear body to said inner convolution.

2. The appliance of claim 1 wherein said elongate member is triangular and is convoluted from a predetermined side thereof.

3. The appliance of claim 1 wherein said elongate member is isosceles-triangular and is convoluted from its base edge so that said coiled configuration has substantially the profile of a spheroid.

4. The appliance of claim 1 wherein said elongate member is isosceles-triangular and is convoluted from its base edge so that said coiled configuration has substantially the profile of an ellipsoid.

5. The appliance of claim 1 wherein said elongate member is right triangular and is convoluted from its base edge so that said coiled configuration has substantially the profile of a cone.

6. The appliance of claim 1 wherein said elongate member is rectangular and is convoluted from its base edge so that said coiled configuration has substantially the profile of a cylinder.

7. The combination with an aerial cable of a unitary visual warning appliance comprising a relatively thin elongate sheet member preshaped in a coiled configuration in which said elongate member is multiply overlyingly convoluted from one end about a predetermined axis with substantial spacing between adjacent overlying convolutions and has an inner convolution with at least a portion having an internal diameter less than the diameter of said cable resiliently gripping a substantial length of said cable, said coiled configuration having sufficient resilience and convolution spacing to allow the rotation of said coiled configuration onto said cable to said inner convolution, said coiled configuration having an exterior diameter several times greater than the diameter of said cable.

References Cited by the Examiner

UNITED STATES PATENTS

| | | | |
|---|---|---|---|
| 67,972 | 8/1867 | Frieland et al. | 267—62 |
| 179,257 | 6/1876 | Birk | 267—62 |
| 1,031,090 | 7/1912 | Roze | 267—62 |
| 1,042,320 | 10/1912 | Chapman | 267—62 |
| 1,627,423 | 5/1927 | Bierce | 189—31.5 |
| 1,641,217 | 9/1927 | Yevseyeff | 267—62 |
| 1,821,021 | 9/1931 | Moise | 40—39 |
| 2,244,353 | 6/1941 | Zaiger | 293—66 |
| 2,649,298 | 8/1953 | Wulff et al. | 267—62 |

LOUIS J. CAPOZI, *Primary Examiner.*